Jan. 28, 1958  J. C. BOTTS  2,821,498
ELECTRICAL CONDUCTORS INSULATED WITH MICA AND
COMPLETELY REACTIVE SYNTHETIC COPOLYMER
RESINOUS COMPOSITIONS
Filed Aug. 20, 1954

WITNESSES

INVENTOR
John C. Botts
BY
ATTORNEY

United States Patent Office 2,821,498
Patented Jan. 28, 1958

2,821,498

ELECTRICAL CONDUCTORS INSULATED WITH MICA AND COMPLETELY REACTIVE SYNTHETIC COPOLYMER RESINOUS COMPOSITIONS

John C. Botts, Penn Township, Allegheny County, Pa., assignor to Westinghouse Electric Corporation, East Pittsburgh, Pa., a corporation of Pennsylvania Application August 20, 1954, Serial No. 451,289

5 Claims. (Cl. 154—80)

The present invention relates to conductors and has particular reference to electrical conductors embodying insulation composed of mica and completely reactive synthetic copolymer resinous compositions.

A widely used procedure for the preparation and processing of high voltage coils, windings, and like electrical conductors is disclosed in U. S. Patent 2,656,290, which is assigned to the assignee of the present invention. That process comprises wrapping electrical conductors with a mica tape wherein the mica flakes are bonded to the backing member or members with a polyester resin. The wrapped conductor then is impregnated with a completely reactive catalyzed mixture of a polyester and a reactive monomer. The catalyzed impregnating composition employed in the patented process has a relatively short storage or shelf life and tends to gel or thermoset on standing unless it is stored under refrigeration. The impregnating composition also is of such a substantial viscosity, for example, from 7 to 100 centipoises, that it will penetrate through a wrapping of, at most, only about 30 layers of mica tape.

The object of the present invention is to provide processes for rapidly and economically impregnating mica tape insulation, adapted for application to electrical conductors, with a composition which can be stored for relatively long periods of time at elevated temperatures without gelling or thermosetting.

Another object of the invention is to provide processes for rapidly and economically impregnating mica tape insulation applied to electrical conductors with a composition which can be stored for relatively long periods of time at elevated temperatures without thermosetting and which can be thermoset at will after application to the wrapped conductors.

A further object of the invention is to provide an impregnating composition adapted to penetrate rapidly through 50 or more layers of a wrapping of a mica tape applied to an electrical conductor.

Other and further objects of the invention will, in part, be obvious and will, in part, appear hereinafter.

Figure 1:
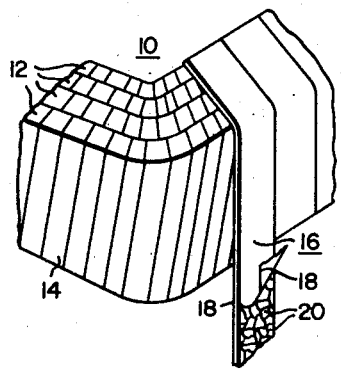
Figure 2:
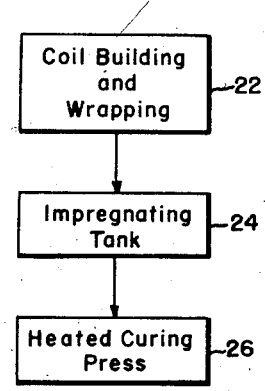

For a more complete understanding of the present invention, reference is made to the following description taken in conjunction with the accompanying drawing, wherein:

Figure 1 is a fragmentary view in perspective of a coil constructed according to this invention; and Fig. 2 is a schematic diagram illustrating, in diagrammatic form, the process of this invention.

In the attainment of the foregoing objects there is provided, in accordance with the present invention, a method of preparing an insulated electrical conductor which comprises wrapping the conductor with a tape comprising a pliable sheet backing member, a layer of mica flakes disposed on the backing member, and a material binding the flakes to the backing member, said binding material comprising at least one unsaturated polyester resin. The wrapped conductor is then impregnated with a liquid unsaturated reactive monomer having the group $>C=C<$, the monomer being miscible and compatible with the unsaturated polyester whereby it readily penetrates through the applied wrapping and blends with the polyester to form a completely reactive polymerizable composition which fills all the interstices and spaces in the wrapped conductor. The wrapped and impregnated conductor then is heated, preferably in the presence of an addition-type polymerization catalyst which has been introduced into the composition, to polymerize the completely reactive composition to a solid, thermoset resin.

The unsaturated polyester employed to bind the mica flakes to the backing member or members in the tape may be prepared conveniently by esterifying a polyhydric alcohol having no other reactive groups than the hydroxyl groups with a substantially molar equivalent of at least one ethylenically unsaturated alpha, beta dicarboxylic acid and anhydrides thereof.

The ethylenically unsaturated alpha, beta dicarboxylic acids which may be employed in accordance with this invention include maleic acid, fumaric acid, maleic anhydride, monochloromaleic acid, itaconic acid, itaconic anhydride, citraconic acid, and citraconic anhydride. In preparing the polyester, up to 95% of the weight of the unsaturated acidic component may be replaced with one or more saturated dicarboxylic acids having from 2 to 10 carbon atoms per molecule, the carboxyl groups being located at the end of the chains and no other reactive groups being present thereon. Examples of such acids include succinic acid, adipic acid, sebacic acid, phthalic anhydride or the like.

The polyhydric alcohols which are suitable for use in accordance with this invention include those aliphatic alcohols having no other reactive groups than the hydroxyl groups. Examples of suitable alcohols include ethylene glycol, glycerol, pentaerythritol, propylene glycol, diethylene glycol, 1,5-pentanediol and triethylene glycol. Mixtures of polyhydric alcohols also may be employed and in some cases epoxides may be used in place of glycols, particularly in reaction with dicarboxylic acids instead of their anhydrides. Castor oil also may be employed in reactions with maleic anhydride. The polyhydric alcohol should be employed, with respect to the total amount of the acidic components, in a molar equivalent, $\pm 10\%$.

The polyester resins are prepared by reacting the acidic components and the polyhydric alcohol in accordance with usual esterification procedures. For example, the acidic components and the polyhydric alcohol are heated under reflux in the presence of an esterification catalyst such as hydrochloric acid, sulphuric acid, benzene sulfonic acid or the like. Removal of water formed in the reaction to increase the degree of estrification may advantageously be effected by utilizing azeotropic distillation as, for example, by carrying out the reaction in the presence of a volatile organic liquid such as toluene, xylene or the like.

The pliable sheet backing member used in preparing the mica tape employed in accordance with this invention may be, for example, rice paper or supercalendered rope paper. Such papers are available in thicknesses as low as of the order of 1 mil (0.001 inch). Furthermore, the sheet backing member may comprise other materials such as glass fiber cloth, asbestos cloth, asbestos paper, or cotton cloth. The asbestos paper may comprise ordinary milled asbestos admixed with small amounts of cellulosic fibers or it may be formed from asbestos that has been ball-milled to an extremely fine subdivision of the asbestos fibers, often called microfine asbestos. Synthetic resins, either in the form of films or woven fabrics such, for example, as nylon cloth or nylon film, may be employed as the pliable sheet backing material. Woven fabric from fibers prepared from linear polymethyleneterphthalate polymers is set forth in U. S. Patent 2,465,319. Sheets of other synthetic resins such, for example, as cellulose acetate butyrate or polyethylene may be employed as a base for the flakes of mica insulation.

In preparing the mica tapes for use in accordance with this invention, mica flakes are showered onto a continuously moving sheet of the pliable backing member and the polyester resin described above is applied to the mica flakes and tape by dripping, spraying, brushing or the like. The mica flakes are applied to the sheet backing in a layer of any suitable thickness. For high voltage insulation, it has been found that sheet backing material of approximately 1 mil in thickness with from a 3 to 10 mil thick layer of mica flakes gives excellent results. A second layer of the pliable sheet backing material may be applied, if desired, on top of the layer or layers of mica flakes. It is not necessary that both sheets applied on either side of the mica flakes be of the same material. Thus, the tape may comprise a backing of paper and a superposed layer of asbestos paper, or asbestos and glass fiber fabric. Excellent results have been obtained using glass paper and glass fiber cloth respectively for the bottom and top of the tape. Alternatively, a sheet of cellophane may be applied on top of the layer or layers of mica flakes to permit the tape to be wound into rolls without adhering to itself. The tape so produced is permanently flexible and does not age, harden or deteriorate appreciably on being stored at either relatively high or low temperatures for appreciable periods of time.

For most applications involving the preparation of high voltage conductor insulation it is preferred to employ the polyester resin in an amount of about 25% and not exceeding 35% by weight of the weight of the composite mica tape. Exceptionally good insulating properties are achieved when composite mica tape embodying from 7% to 13% by weight of polyester resin is employed. An example of a tape which has been found to provide particularly satisfactory results in practice is one comprising 2 sheets each 1 mil thick, one being glass fiber cloth and the other glass paper, between which are placed a layer of from 3 to 5 mils thickness of mica flakes of an average diameter of about 1 inch, and from 7% to 13% by weight, based on the total weight of the composite tape, of a polyester resin. Such a tape feels and appears to be dry but is bonded together extremely well and possesses great strength whereby it can be taped firmly upon electrical conductors without loss of mica flakes. Such tapes have been prepared using mica flakes of an average area of 10 square inches as well as using mica flakes having an area of only a fraction of an inch.

The wrapped electrical conductors are impregnated with a composition comprising a liquid unsaturated reactive monomer having the group $>C=C<$. Examples of monomers which are suitable for use in accordance with this invention include monostyrene, vinyl toluene, alphamethylstyrene, 2,4-dichlorostyrene, paramethyl styrene, vinyl acetate, methyl methacrylate, ethyl acrylate, allyl alcohol, methallyl alcohol acrylonitrile, methyl vinyl ketone, vinylidene chloride, butyl methacrylate, and 1,3-chloroprene, as well as mixtures of two or more of any of these monomers. It will be noted that these monomers contain only a single $>C=C<$ group. The impregnating composition comprising one or more of these monomers, ordinarily in combination with a catalyst, is characterized by the fact that it is a fluid which will not gel or thermoset even when heated to elevated temperatures in the presence of a catalyst.

It is preferred to use those monomers which have a viscosity at 25° C. of one centipoise or less, such as monostyrene, methyl methacrylate, and vinyl toluene, since they will penetrate through a relatively large number of layers, for example, up to 50 or more, of mica tape wrapping.

It has been found that particularly satisfactory results are obtained when at least one addition-type polymerization catalyst is admixed with the liquid unsaturated monomer comprising the impregnating mixture of this invention. Examples of such catalysts are benzoyl peroxide, lauroyl peroxide, methyl ethyl ketone peroxide, t-butyl hydroperoxide, ascaridole, tert-butyl perbenzoate, di-t-butyl dipherphthalate, ozonides, and similar catalysts in an amount of from 0.1% to 2% by weight, based on the total weight of the impregnating composition, although somewhat larger or smaller amounts may be employed if desired. Polymerization accelerators such as cobalt naphthenate and azomethine also may be admixed with the monomers and the catalysts in the impregnating composition.

Referring to Fig. 1 of the drawing, there is illustrated a coil 10 constructed in accordance with the present invention. The coil is composed of a plurality of conductors 12. Each conductor 12 is composed of copper wrapped with turn insulation 14. The turn insulation 14 may be composed, for example, of a heat resistant wire enamel in combination with a wrapping of glass fabric, asbestos, or other insulation. The turn insulation 14 is not sufficient for withstanding the severe voltage gradients that will be present between the conductors 12 and ground. Therefore, the turn insulated conductors 12 are wrapped with a plurality of layers of composite mica tape 16, each layer of tape being shown as butted, although a lapped tape wrapping is equally satisfactory. As shown, the mica tape 16 comprises a pair of pliable sheet backing members 18 having a layer of mica flakes 20 disposed therebetween and bonded thereto by a polyester resin as described herein.

Referring to Fig. 2 of the drawing, there is a schematic diagram illustrating the steps of the process, in accordance with this invention, for the preparation and impregnation of a coil suitable for use in a high voltage generator. The first step 22 comprises the building of a coil. The coil comprising a plurality of turns of conductors first is wrapped with mica tape prepared in the manner indicated above. Such tape comprises a pair of pliable sheet backing members having a layer of mica flakes disposed therebetween and bonded thereto by a polyester resin as described herein. The tape may be applied half-lapped or butted or otherwise as desired. Generally, a plurality of layers of the composite tape are wound about the coil, 12 or more layers usually being used.

The coil so prepared and wrapped is placed within an impregnating tank 24 and subjected to a heat drying and evacuating operation to remove substantially all moisture, air and other undesirable voltatile material from the coil. The impregnating composition of this invention comprising a liquid unsaturated reactive monomer admixed with an addition-type polymerization catalyst then is introduced into the tank until the coil is completely submerged in the composition. While the coil is completely covered with the impregnating composition atmospheric air, carbon dioxide, nitrogen or other relatively inert gas is introduced into the impregnating tank under pressure to assist the impregnating composition in penetrating deeply into the wrapped coil and blending with the polyester resin to form a completely reactive polymerizable composition which completely fills all the spaces and interstices in the wrapped coil. The impregnating treatment need not be of long duration. Ten minutes under pressure ordinarily is sufficient to completely impregnate and saturate small windings. Longer impregnation periods, for example, up to about several hours will insure the complete penetration and saturation of the largest coils and windings wrapped with many layers of tape. It will be understood, of course, that while vacuum impregnation provides the best results, ordinary immersion in an open pan or tank will give satisfactory results.

The impregnated but uncured coil then is withdrawn from the impregnating tank, drained briefly and subjected to a curing operation. If desired, the coil may be wrapped with an impervious tape to prevent escape or loss of the liquid composition therefrom during the curing operation. One preferred method of curing the polymerizable resinous composition comprises placing the impregnated coil in a sizing and curing press 26 provided with heating elements, such as electric heating members, hot water pipes, or the like. The polymerizable resinous composition may be cured on the coil while the same is in the mold by subjecting the same to heat or actinic light, or both, to polymerize and cure the resin to a solid state. In other cases, the wrapped coils can be put in an oven and cured by heating to temperatures above 80° C., for example, up to about 135° C.

To illustrate even more clearly the advantages and capabilities of the present invention, the following examples are set forth. The parts and percentages given are by weight unless otherwise indicated.

Example I

A mixture of 44 mole percent of adipic acid and 6 mole percent of fumaric acid was combined with 50 mole percent of propylene glycol and reacted with carbon dioxide sparging for a period of about 4 hours at a temperature of 140° C. in a closed reaction vessel. The temperature then was raised to 220° C. over a 4-hour period, and the reaction then continued at that temperature for an additional 8 hours. A syrupy polyester resin was obtained.

Example II

A composition comprising the reaction product of 10 mole percent of maleic anhydride, 40 mole percent of adipic acid, and 50 mole percent of diethylene glycol was prepared according to the procedure described in Example I.

Example III

A syrupy polyester resin was prepared according to the procedure described in Example I by reacting 30 mole percent of sebacic acid, 20 mole percent of maleic anhydride, and 50 mole percent of diethylene glycol.

Example IV

A high voltage copper bar was prepared by wrapping the same with a mica tape in which the mica flakes were disposed between a sheet of glass paper and a sheet of glass cloth, and bonded with 10% of its weight of the polyester resin prepared in Example I.

The wrapped bar was placed in an impregnating tank and subjected to a heat drying and evacuating operation to remove substantially all moisture, air, and other undesirable voltatile material. An impregnating composition comprising 99.5% by weight of methyl methacrylate and 0.5% by weight of bezoyl peroxide was introduced into the tank until the wrapped bar was completely submerged in the composition. Atmospheric air was introduced into the tank under pressure to assist the impregnating composition in penetrating deeply into the tape wrapping and blending with the polyester resin to form a completely reactive polymerizable composition. The treated bar was then removed from the tank and heated to cure the polymerizable composition to a solid state. The composite cured insulation on the bar so prepared had power factors as follows:

PERCENT POWER FACTOR

| 2 kv. | | 5 kv. | | 10 kv. | | 16 kv. | |
|---|---|---|---|---|---|---|---|
| 25° C. | 120° C. | 25° C. | 120° C. | 25° C. | 120° C. | 25° C. | 120° C. |
| 4.2 | 9.5 | 4.6 | 9.9 | 6.7 | 13.5 | 10.1 | 16.7 |

The composite cured insulation withstood 55 kv. for one minute and had a tensile strength of 5800 pounds per square inch and an elongation of 0.95%, when tested at 100° C.

Example V

A copper bar was prepared by wrapping the same with a mica tape having backing members of glass paper and glass cloth between which was disposed a layer of mica flakes. The flakes were bound to the backing members with the polyester resin of Example I. The wrapped bar was impregnated, and cured as described in Example IV, with a mixture of 99.5% by weight of monostyrene and 0.5% by weight of benzoyl peroxide in an amount equal to 4 times the weight of the polyester. The composite cured insulation had power factors as follows:

PERCENT POWER FACTOR

| 2 kv. | | 5 kv. | | 10 kv. | | 16 kv. | |
|---|---|---|---|---|---|---|---|
| 25° C. | 120° C. | 25° C. | 120° C. | 25° C. | 120° C. | 25° C. | 120° C. |
| 1.8 | 13.1 | 2.0 | 13.6 | 3.3 | 14.9 | 4.5 | 16.1 |

The composite cured insulation withstood 70 kv. for one minute and had a tensile strength of 3400 pounds per square inch and an elongation of 0.77% when tested at 100° C.

The present invention permits the utilization of a catalyzed monomer impregnating composition which may be stored for relatively long periods of time at room temperatures prior to its use. Such a composition affords obvious advantages in the process of this invention as compared with prior art methods for preparing such insulated electrical conductors wherein the impregnating composition used necessarily had to be stored under refrigeration, prior to use, to prevent premature gelling thereof. The impregnating composition of this invention affords still a further advantage in that it has a viscosity which is substantially lower than that of prior art impregnating compositions. The lower viscosity permits impregnating coils wrapped with up to 50 layers of mica tape and facilitates the preparation of insulated electrical bushings as described in U. S. Patent 2,669,601, which is assigned to the assignee of the present invention.

While this invention has been disclosed with reference to particular examples and embodiments thereto, it will be understood, of course, that certain substitutions, changes and modifications may be made therein without departing from its true scope.

I claim as my invention:

1. The method of preparing an insulated electrical conductor comprising wrapping the conductor with a tape comprising a pliable sheet backing member, a layer of mica flakes disposed on the backing member, and a material binding the flakes to the backing member comprising at least one unsaturated polyester resin, impregnating the wrapped conductor with a composition consisting essentially of an addition-type polymerization catalyst and a liquid unsaturated reactive monomer having only a single $>C=C<$ group, the monomer being miscible and compatible with the polyester resin whereby it readily penetrates through the applied tape wrapping and blends with the polyester to form a completely reactive polymerizable composition filling all the interstices and spaces in the wrapped conductor, and heating the wrapped conductor to polymerize the completely reactive composition to a solid, thermoset resin.

2. The method set forth in claim 1 wherein the polyester binding material comprises a polyester obtained by reacting a polyhydric alcohol having no other reactive groups than the hydroxyl groups with a substantially molar equivalent of at least one ethylenically unsaturated alpha, beta dicarboxylic acid and anhydrides thereof.

3. The method for preparing a winding conductor for an electrical machine which comprises wrapping the winding conductor with a plurality of layers of a composite tape, the tape consisting essentially of two superimposed sheets of pliable material, a layer of mica flakes disposed between the two superimposed sheets, and a polyester binder applied to the layer of mica flakes and the surfaces of the sheets of pliable material in contact with the mica flakes, the binder comprising at least one unsaturated polyester resin, impregnating the wrapped conductor with a composition consisting essentially of an addition-type polymerization catalyst and a liquid unsaturated reactive monomer having only a single >C=C< group, the monomer being miscible and compatible with the polyester whereby it readily penetrates through the applied tape wrapping and blends with the polyester to form a completely reactive polymerizable composition filling all the interstices and spaces in the wrapped conductor, and heating the wrapped conductor to polymerize the completely reactive composition to a solid, thermoset resin.

4. The method set forth in claim 3 wherein the polyester binder constitutes up to about 35% by weight of the composite mica tape and comprises a polyester obtained by reacting (a) from 6 to 10 mole percent of at least one ethylenically unsaturated alpha, beta dicarboxylic acid and anhydrides thereof, and (b) from 44 to 40 mole percent of at least one straight chain saturated dicarboxylic acid having 2 to 10 carbon atoms per molecule, the carboxyl groups being located at the ends of the chain and no other reactive groups being present thereon, with (c) a molar equivalent within ±10% of the acidic components of a polyhydric alcohol having no other reactive groups than the hydroxyl groups present thereon.

5. The method of preparing an insulated electrical conductor comprising wrapping the conductor with a tape comprising (1) a pliable sheet backing member, (2) a 3 to 10 mil thick layer of mica flakes disposed on the backing member, and (3) a material binding the flakes to the backing member comprising at least one unsaturated polyeter resin, impregnating the wrapped conductor with a liquid composition comprising monostyrene and benzoyl peroxide, the impregnating composition being miscible and compatible with the polyester resin whereby it readily penetrates through the applied tape wrapping and blends with the polyester to form a completely reactive polymerizable composition filling all the interstices and spaces in the wrapped conductor, and heating the wrapped conductor to polymerize the completely reactive composition to a solid, thermoset resin.

References Cited in the file of this patent

UNITED STATES PATENTS

| | | |
|---|---|---|
| 2,601,243 | Bott et al. | June 24, 1952 |
| 2,656,290 | Berberich | Oct. 20, 1953 |
| 2,669,601 | Johnson et al. | Feb. 16, 1954 |
| 2,674,648 | Nicodemus | Apr. 6, 1954 |
| 2,707,204 | Richardson et al. | Apr. 26, 1955 |